US012220718B2

(12) United States Patent
Shea

(10) Patent No.: US 12,220,718 B2
(45) Date of Patent: Feb. 11, 2025

(54) LOCK DEVICE AND SYSTEM FOR PUMP-STYLE BOTTLE DISPENSERS

(71) Applicant: Kelly Shea, Lithia, FL (US)

(72) Inventor: Kelly Shea, Lithia, FL (US)

( * ) Notice: Subject to any disclaimer, the term of this patent is extended or adjusted under 35 U.S.C. 154(b) by 240 days.

(21) Appl. No.: 17/968,584

(22) Filed: Oct. 18, 2022

(65) Prior Publication Data

US 2023/0136584 A1 May 4, 2023

Related U.S. Application Data

(60) Provisional application No. 63/273,841, filed on Oct. 29, 2021.

(51) Int. Cl.
*B05B 11/00* (2023.01)
*B05B 11/10* (2023.01)

(52) U.S. Cl.
CPC ................................ *B05B 11/1059* (2023.01)

(58) Field of Classification Search
CPC .................................................. B05B 11/1059
See application file for complete search history.

(56) References Cited

U.S. PATENT DOCUMENTS 1,260,501 A * 3/1918 Wise .................. B05B 11/1045 222/387
4,384,660 A * 5/1983 Palmisano .......... B05B 11/1059 24/703.1
5,975,370 A * 11/1999 Durliat .................. B05B 11/106 222/384
6,422,425 B1 * 7/2002 Tada .................. B05B 11/1094 222/153.07
7,367,476 B2 * 5/2008 Law .................... B05B 11/1059 222/153.09
8,602,269 B2 * 12/2013 Alluigi ................ B05B 11/1025 222/153.13
10,821,457 B2 * 11/2020 Tecchiolli ........... B05B 11/1059

FOREIGN PATENT DOCUMENTS

GB 2519173 A * 4/2015 ............ A61M 15/08

* cited by examiner

*Primary Examiner* — Donnell A Long
(74) *Attorney, Agent, or Firm* — Jason T. Daniel, Esq.; Daniel Law Offices, P.A.

(57) ABSTRACT

A lock device for pump-style bottle dispensers includes first and second body segments each having an inside facing wall with a semi-circular indentation. The first and second body segments are connected together by a hinge to transition between an open position and a closed position. In the open position, the shaft of a pump mechanism is positionable between the semi-circular indentations. In the closed position the shaft is encircled by the semi-circular indentations. A lip and indentation are formed along the first and second body segments, respectively and form a compression fitting when in the closed position. Magnetic elements are positioned in the first and second body segments to securing the segments in the closed position. Multiple lock devices are vertically stackable via a plurality of holes positioned along the top surface of the body segments and complementary pegs located along the bottom surface of the body segments.

12 Claims, 4 Drawing Sheets

LOCK DEVICE AND SYSTEM FOR PUMP-STYLE BOTTLE DISPENSERS

CROSS-REFERENCE TO RELATED APPLICATIONS

This application claims the benefit of U.S. Application Ser. No. 63/273,841 filed on Oct. 29, 2021, the contents of which are incorporated herein by reference.

TECHNICAL FIELD

The present invention relates generally to bottle attachment devices, and more particularly to a device for securement to a pump-style mechanism for preventing operation of the same.

BACKGROUND

The statements in this section merely provide background information related to the present disclosure and may not constitute prior art.

Many consumer products such as lotions, creams, liquid soap, sanitizers, and the like are provided in bottles having a pump for dispensing the product. One of the most common types of dispensing pump is a saddle head dispensing pump which includes an elongated top end having an opening along one end. In operation, a user will push the head end downward which causes the internal pump to dispense a measured amount of the bottle contents through the opening at the end of the head.

Due to the universal adaptation of these and other types of dispensers, it is extremely common for at least one, and often times multiple such products to be taken with a user when traveling. In such situations, the bottle(s) are typically placed in a toiletry bag which is then packed within a suitcase. Although most dispensers have a built-in lock which is twist activated, the movement of the bags during travel often causes the lock to become disabled.

As such, it is not uncommon for a user to arrive at their destination to find that the pump mechanism was inadvertently activated during the user's trip, thus resulting in the bottle contents being dispensed into the bag.

Accordingly, it would be beneficial to provide a lock device for pump-style bottle dispensers so as to overcome the drawbacks noted above.

SUMMARY OF THE INVENTION

The present invention is directed to a lock device for pump-style bottle dispensers. One embodiment of the present invention can include first and second body segments each having an inside facing wall with a semi-circular indentation. The first and second body segments can be connected together along one end by a hinge to transition between an open position and a closed position.

In the open position, the shaft of a pump mechanism can be positioned between the semi-circular indentations and the device can be closed to encircle the shaft. When so positioned, the top surface is positioned against the bottom surface of the pump head, and the bottom surface of the device is positioned against the pump knob. In this regard, the device prevents vertical movement of the pump head, thereby preventing the pump from inadvertently dispensing contents.

In one embodiment, a lip and indentation are formed along the first and second body segments, respectively. The lip and indentation forming a compression fitting when in the closed position for preventing inadvertent separation of the body segments. The first and second segments can also include connectors such as magnetic elements for securing the segments together.

In one embodiment, a plurality of holes is positioned along the top surface of the body segments and complementary pegs are positioned along the bottom surface of the body segments. The pegs and holes permit vertical stacking of multiple lock devices to form user-customizable heights for adapting to different sized pump dispensers.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
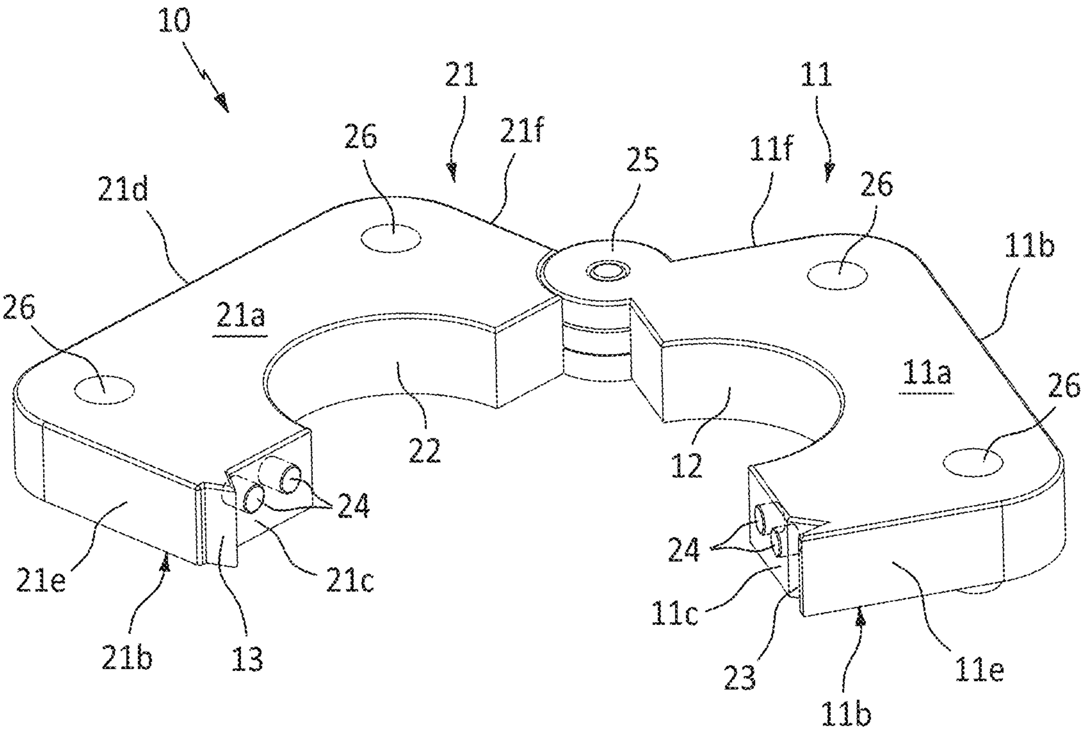
FIG. 1 is a top perspective view of a lock device in the open position, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As described herein, the term "hingedly connected" "rotatably secured" and derivatives thereof shall be used interchangeably to describe a situation wherein two identified objects are joined together in a manner that allows one or both of the objects to pivot, move, and/or rotate about or in relation to the other object in one or both of a horizontal, diagonal or vertical manner. Several nonlimiting examples of connectors for pivotally connecting objects together include traditional single hinge mechanisms, ball joint couplers, and/or swivel flanges, for example.

FIGS. 1-4 illustrate one embodiment of a lock device for a pump-style bottle dispensers 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 2:
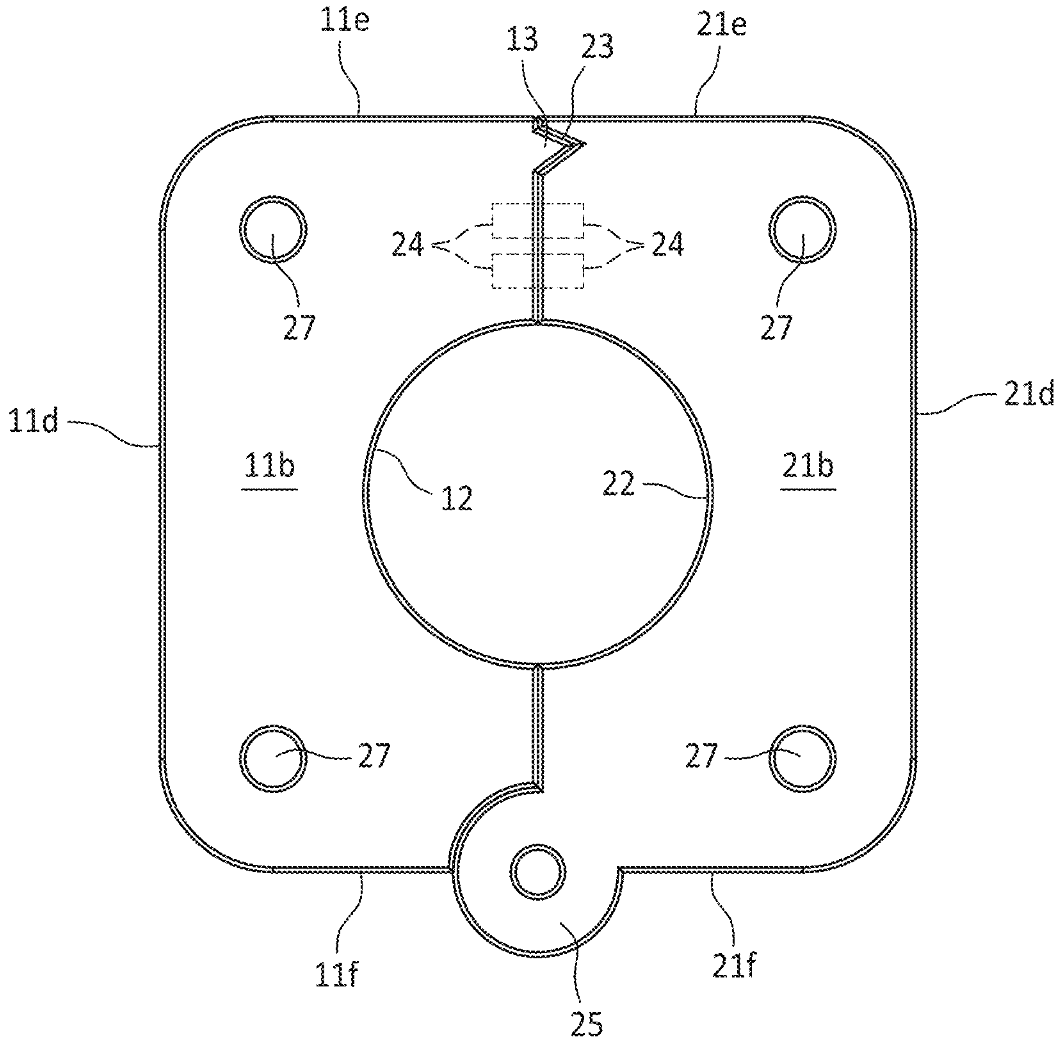
FIG. 2 is a bottom perspective view of the lock device in the closed position, in accordance with one embodiment of the invention.

FIGS. 1 and 2 illustrate one embodiment of the device in an open and closed position, respectively. As shown, each device 10 can include a first body segment 11, and a second body segment 21 that are joined together by a hinge 25.

In one embodiment, the first body segment 11 can include a top surface 11*a*, a bottom surface 11*b*, an inside wall 11*c*, an outside wall 11*d*, a first end 11*e* and a second end 11*f*. A semi-circular indentation 12 can be provided along the middle of the inside wall, and a protruding lip 13 can extend outward from the inside wall at a location adjacent to the first end. Likewise, the second body segment 21 can include a top surface 21*a*, a bottom surface 21*b*, an inside wall 21*c*, an outside wall 21*d*, a first end 21*e* and a second end 21*f*. A semi-circular indentation 22 can be provided along the middle of the inside wall, and an indentation 23 can be provided along the inside wall at a location adjacent to the first end 21*e*. The indentation including a shape and size that is complementary to the shape and size of the protruding lip 13.

As described herein, each of the body segments may be formed from materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

In the preferred embodiment, body segments 11 and 21 can be essentially mirror images of each other, so as to form a generally square shape when in the closed position. To this end, when in the closed position, the semi-circular indentations 12 and 22 form a complete circle that is positioned in the middle of the device, and the protruding lip 13 is positioned within the indentation 23.

In one embodiment, the lip and indentation are designed to create a compression fitting that maintains the device in the closed position when the lip is inserted into the indentation. In one embodiment, the device can also include a plurality of connectors 24 such as the illustrated magnets, for example, which are positioned along and/or embedded within the inside walls 11*c* and 21*c*. The connectors can also function to secure the inside walls together to maintain the device in the closed position.

As shown, the hinge 25 can be positioned along the inside walls 11*c* and 21*c* at a location adjacent to second ends 11*f* and 21*f*, respectively. As described herein, the hinge can include, comprise or consist of any type of device capable of moving, rotating and/or pivoting the body segments between the open and closed positions.

In one embodiment, the device can be manufactured so as to be stackable, thereby forming a system for allowing a user to adjust the overall height of the stacked components. To this end, a plurality of holes 26 can be positioned along the top surfaces 11*a* and 21*a* of the body segments, and a plurality of pegs 27 can extend outward from the bottom surfaces 11*b* and 21*b* of the body segments.

Figure 3:
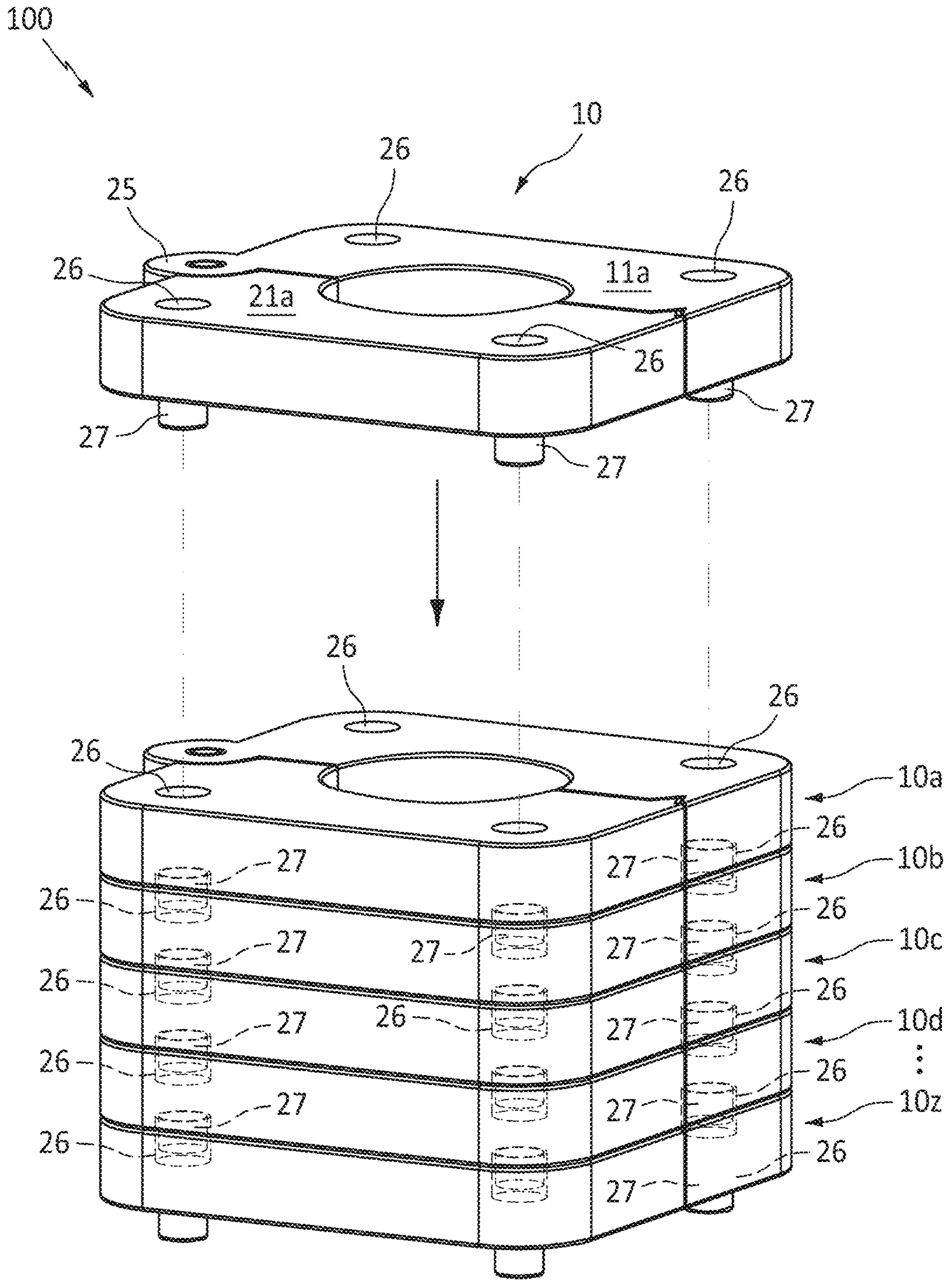
FIG. 3 is a perspective view of a system comprising a plurality of lock devices that are vertically stacked, in accordance with one embodiment of the invention.
Figure 4:
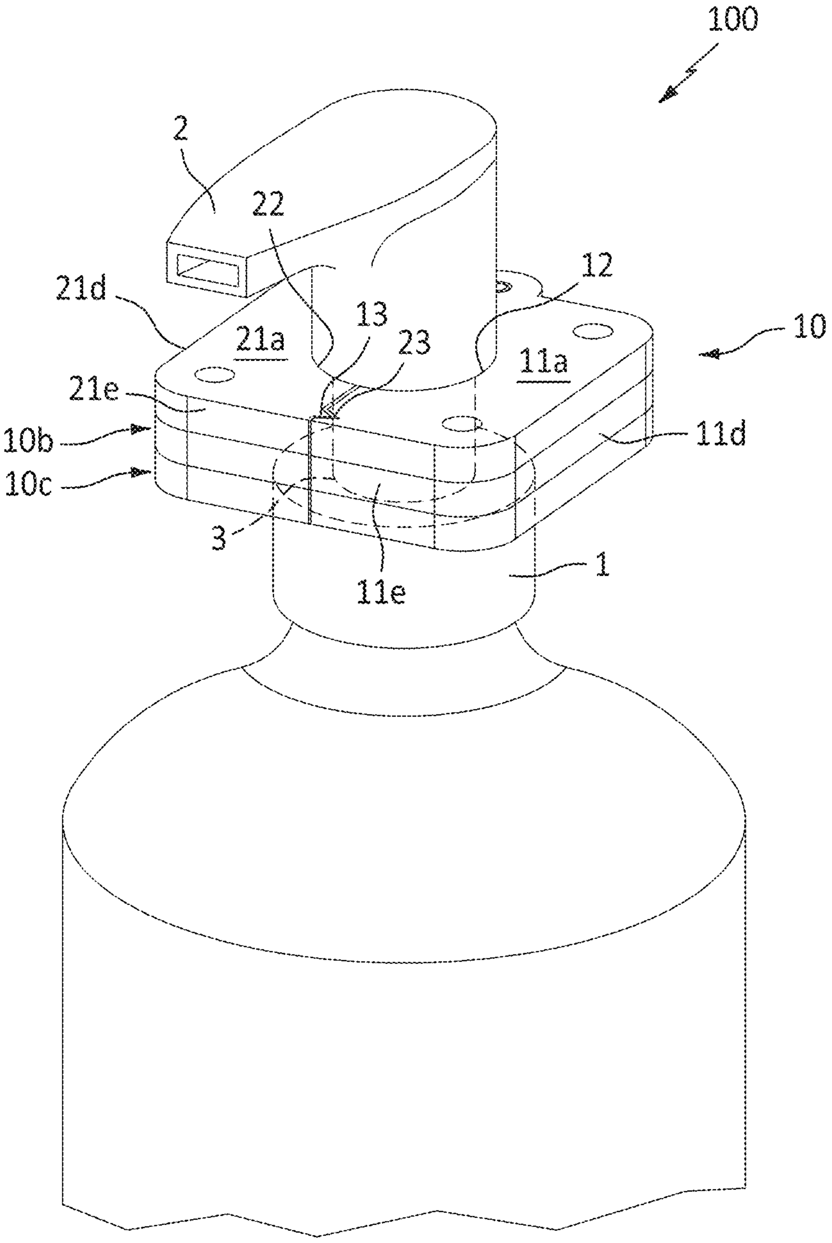
FIG. 4 is a perspective view of the system in operation, in accordance with one embodiment of the invention.

As shown best at FIGS. 3 and 4, each of the holes 26 and pegs 27 can include complementary shapes, sizes and locations along the respective body segments to permit any number of individual lock devices 10*a*-10*z* to be vertically stacked such that the pins on the upper device are positioned within the holes on the subsequent lower device being stacked. As shown and described, devices 10*a*, 10*b*, 10*c*, 10*d* . . . 10*z* are each identical to locking device 10 described above.

To this end, a system 100 comprising a plurality of individual lock devices advantageously allows a user to stack any number of devices together with the shaft 3 of a pump located between the respective semi-circular indentations to achieve a customizable height (measured from the bottom surface of the lowest stacked device to the top surface of the top stacked device) that extends between the top wall of the pump knob 1, and the bottom wall of the pump head 2, so as to create a physical barrier to prevent movement of the head.

Although not specifically illustrated, each device 10 can be secured onto the pump mechanism by starting in the open position, such that shaft 3 of pump is located between the semicircular indentations. When so positioned, the body segments can be closed together and stacked as shown at FIG. 4.

Although described above as utilizing a plurality of individual units with a pump device, other embodiments are contemplated. To this end, each individual device 10 can be manufactured to include any number of different thicknesses (e.g., distance between bottom surfaces 11*b*/21*b* and top surfaces 11*a*/21*a*, respectively) so as to allow a single device to be positioned between the top wall of the pump knob 1, and the bottom wall of the pump head 2, so as to create the physical barrier to prevent movement of the head.

Although described above as including a hinge for allowing the body segments 11 and 21 to transition between an open and closed position, other embodiments are also contemplated. To this end, one embodiment contemplates the use of two identical halves wherein the hinge is replaced with connectors such as the above-described magnets along the connecting inside walls. In such a feature, each body segment can be physically separated and joined together by the connectors to form the assembled device. Moreover, such devices can include the holes and pegs noted above to permit vertical stacking.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A lock device, comprising:
- a first body segment having a top wall, a bottom wall, an outside wall, an inside wall a first end and a second end;
- a first semi-circular indentation that is positioned along the inside wall of the first body segment;

- a second body segment having a top wall, a bottom wall, an outside wall, an inside wall a first end and a second end;
- a second semi-circular indentation that is positioned along the inside wall of the first second body segment; and
- a plurality of holes that are positioned along each of the top surface of the first body segment and the top surface of the second body segment,
- wherein the first body segment and the second body segment are configured to transition between an open position and a closed position, and
- in the closed position, the first semi-circular indentation and the second semi-circular indentation form a central opening.

2. The device of claim 1, wherein the central opening comprises an aperture positioned in a center of the device, and the central opening extends from the top wall to the bottom wall of each of the first body segment and the second body segment.

3. The device of claim 2, wherein the central opening includes a shape and a size that is configured to receive and engage a shaft of a pump mechanism.

4. The device of claim 3, wherein the top wall of the first body segment and the top wall of the second body segment are each configured to engage a bottom surface of a pump head connected to the shaft of the pump mechanism.

5. The device of claim 4, wherein the bottom wall of the first body segment and the bottom wall of the second body segment are each configured to engage a top surface of a pump knob connected to the shaft of the pump mechanism.

6. The device of claim 5, wherein the first body segment and the second body segment are constructed from a rigid material and are configured to prevent a movement of the pump shaft in a direction toward the pump knob.

7. The device of claim 1, further comprising:
- a plurality of pegs that are positioned along each of the bottom surface of the first body segment and the bottom surface of the second body segment.

8. The device of claim 7, wherein each of the plurality of pegs and the plurality of holes include complementary shapes.

9. The device of claim 8, wherein each of the plurality of pegs and the plurality of holes include complementary locations along the first body segment and the second body segment.

10. A lock system, comprising:
- a plurality of lock devices, each of the plurality of lock devices including:
- a first body segment having a top wall, a bottom wall, an outside wall, an inside wall a first end and a second end;
- a first semi-circular indentation that is positioned along the inside wall of the first body segment;
- a second body segment having a top wall, a bottom wall, an outside wall, an inside wall a first end and a second end;
- a second semi-circular indentation that is positioned along the inside wall of the first second body segment; and
- a plurality of holes that are positioned along each of the top surface of the first body segment and the top surface of the second body segment,
- wherein the first body segment and the second body segment are configured to transition between an open position and a closed position, and
- in the closed position, the first semi-circular indentation and the second semi-circular indentation form a central opening.

11. The device of claim 10, further comprising:

a plurality of pegs that are positioned along each of the bottom surface of the first body segment and the bottom surface of the second body segment on each of the plurality of lock devices.

12. The device of claim 11, wherein each of the plurality of lock devices are configured to be vertically stacked together.

* * * * *